Sept. 27, 1932.  W. SCHNEIDER  1,879,537

ANTIHALATION LAYERS FOR PHOTOGRAPHIC MATERIAL

Filed Oct. 15, 1930

Inventor:
Wilhelm Schneider,
By  Attorney
Philip S. Hopkins.

Patented Sept. 27, 1932

1,879,537

UNITED STATES PATENT OFFICE

WILHELM SCHNEIDER, OF DESSAU IN ANHALT, GERMANY, ASSIGNOR TO AGFA ANSCO CORPORATION, OF BINGHAMTON, NEW YORK, A CORPORATION OF NEW YORK

ANTI-HALATION LAYERS FOR PHOTOGRAPHIC MATERIAL

Application filed October 15, 1930, Serial No. 488,990, and in Germany October 30, 1929.

My present invention relates to photographic materials and more particularly to new anti-halation layers as used on photographic plates or films.

The use of dyes of the fuchsone group, for instance, aurine, for the manufacture of anti-halation layers is known. These dyes have, however, the inconvenience that they are soluble only in strongly alkaline developers, whilst they are insoluble in developers of a less alkalinity, for instance, in developers containing borax. Furthermore, the developer is intensely colored by the aurine which dissolves, forming a phenolate.

According to the present invention, anti-halation layers of an increased solubility in alkali are made by using as dyes bodies of the fuchsone series which contain one or more carboxyl-groups in the molecule. These dyes very quickly and completely dissolve, even in very weakly alkaline developers, and furthermore, have the advantage of coloring the developer considerably less, because, owing to the presence of the carboxyl-groups a formation of phenolate in the developer is practically impossible. The new anti-halation layers are made in known manner; the dyes are either dispersed in a suitable binding agent, for instance gelatin, gum arabic, glucose or the like or applied in an alcoholic solution without using a binding agent. Besides the fuchsone dyes mentioned above the layers may, of course, also contain other suitable dyes.

Figure 1:
Figure 2:

In the accompanying drawing Fig. 1 and Fig. 2 illustrate my invention, the view being a conventional, exaggerated, cross-sectional showing. Fig. 1 shows the anti-halation layer applied to the back of the film or plate and Fig. 2 the antihalation layer arranged between the sensitized emulsion and the base of the photographic film or plate.

The following examples illustrate the invention:—

*Example 1.*—75 grams of gelatin are dissolved in 1000 cc. of water and 3–4 grams of aurine-di-carboxylic acid corresponding probably to the formula

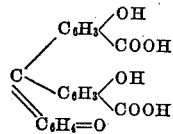

are dissolved in 100 cc. of alcohol while adding 1 cc. of ammonia; the two solutions are mixed, and 5 cc. of an alum solution (1:25) are then added. The solution may be used for the manufacture of anti-halation layers on plates or films. The layer may be applied between the support and the emulsion layer or on the rear side of the support.

*Example 2.*—75 to 150 grams of aurine-mono-carboxylic acid corresponding probably to the formula

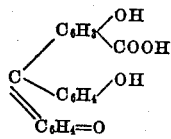

are dissolved in 900 cc. of alcohol and the solution is mixed with one prepared by dissolving 15 grams of shellac in 100 cc. of alcohol. The mixture is used for the manufacture of anti-halation layers on the back of plates or films.

*Example 3.*—50 to 100 grams of hydroxy-carboxy-fuchsone of the formula

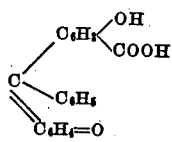

and 4 grams of alkali blue (free color acid) are dissolved in 900 cc. of alcohol. A solution prepared by dissolving 15 grams of shellac in 100 cc. of alcohol is then added. The mixture is likewise used for the manufacture of anti-halation layers on the back plates or films.

My present invention is not limited to the foregoing examples or to the specific details given therein. Thus, I may use, for instance, other dyes of the fuchsone series substituted in the manner described, such as aurine-tri-carboxylic acid and those substituted in the nuclei by halogen, alkyl and equivalent substituents. Or I may use other binding agents well known in the art containing the dye either in solution or in a fine dispersion; finally as mentioned above the use of a binding agent may be dispensed with, and the dye may be applied immediately upon the support.

What I claim is:—

1. Photographic materials provided with an anti-halation layer containing a dye of the fuchsone series having at least one carboxylic group in the molecule.

2. Photographic materials provided with an antihalation layer containing aurine-dicarboxylic acid.

3. Photographic material provided with an antihalation layer containing aurine-mono-carboxylic acid.

4. Photographic material provided with an antihalation layer containing hydroxy-carboxy-fuchsone.

In testimony whereof, I affix my signature.

WILHELM SCHNEIDER.